Nov. 14, 1939.  J. D. SPALDING  2,179,645
DRILL STEM ROLLER DRIVE BUSHING
Original Filed July 19, 1937  2 Sheets-Sheet 2
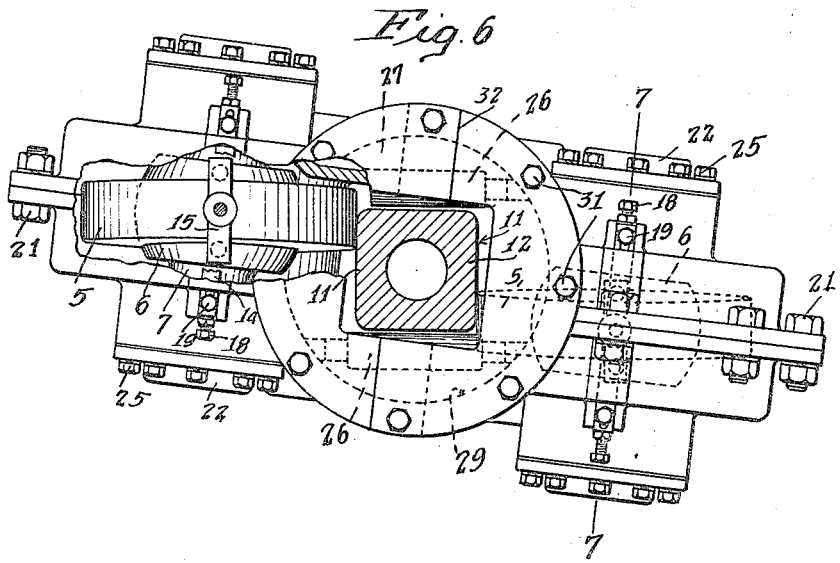
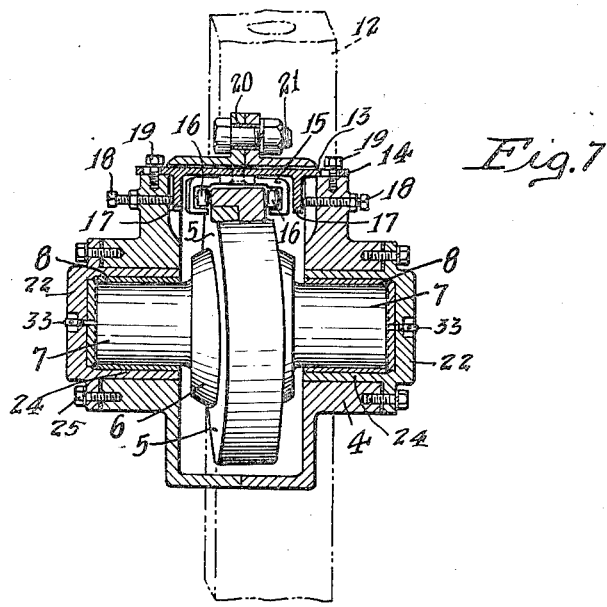
Inventor
John D. Spalding
By Lyon & Lyon
Attorneys Patented Nov. 14, 1939

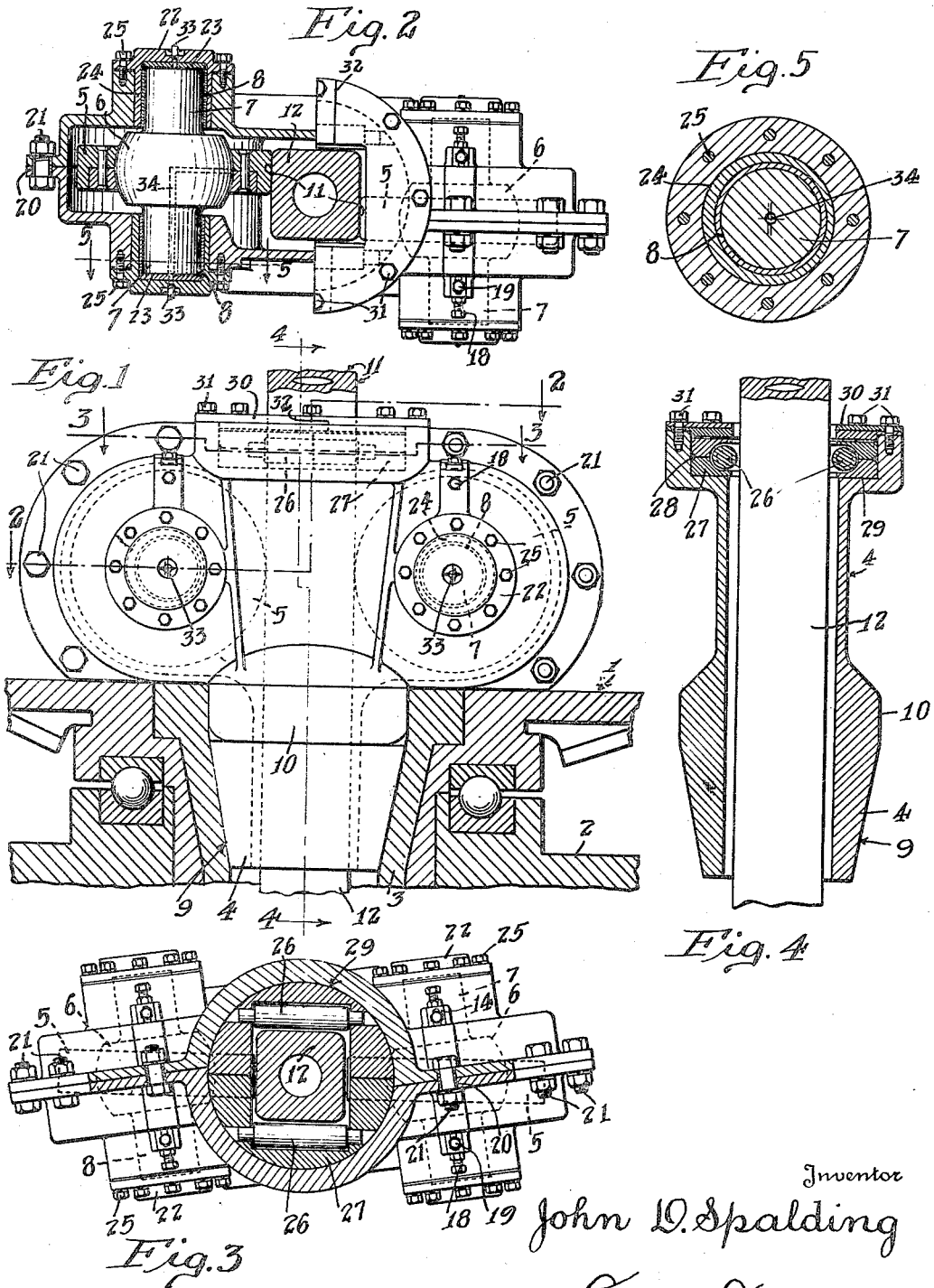

2,179,645

UNITED STATES PATENT OFFICE 2,179,645

DRILL STEM ROLLER DRIVE BUSHING

John D. Spalding, Los Angeles, Calif., assignor, by mesne assignments, to The National Supply Company, Pittsburgh, Pa., a corporation of Pennsylvania Application July 19, 1937, Serial No. 154,433
Renewed March 4, 1938

13 Claims. (Cl. 255—23)

This invention relates to rotary well drilling apparatus, and more particularly to a rotary drill stem roller drive bushing for use in conjunction with a rotary machine.

In the drilling of wells wherein the rotary drilling process is utilized the drill stem is rotated as it is advanced in the making of the well hole. Driving a drill stem is customarily accomplished by the use of a rotary machine which includes the driving element or bushing which approximates or conforms to the form or shape of the drill stem so that by rotating the bushing by means of the rotary table the drill stem is rotated. During the rotation of the drill stem the same is advanced through the rotary machine as the hole progresses.

The tendency in the use of such devices for the rotating of the drill stem is for the drill stem, usually of square formation, to be gripped at its edges more or less upon a line contact with the result of injury to the surface of the drill stem and an insecure driving connection between the drill stem and the driving bushing.

The principal object of this invention is to provide the drill stem roller drive bushing wherein the rollers are self-aligning so that they may automatically adjust themselves to contact with the driving faces of the drill stem, allowing also a free longitudinal movement of the drill stem through the opening of the rotary machine, while still providing a positive driving means for the rotation of the drill stem.

Another object of this invention is to provide a drill stem driving device which includes fixed shafts which are supported by the body of the device and which carry rollers so mounted as to have self-aligning characteristics relative to the drill stem being driven.

Another object of this invention is to provide a drill stem driving device having self-aligning rollers, the centers of movement of which are offset with respect to a plane passing through the axis of the drill stem and normal to its driving faces, whereby the rollers drive diagonally opposite faces of the drill stem.

Another object of this invention is to provide a drill stem roller drive bushing having roller shafts rotatably mounted in eccentric bearing housings carried in the body of the bushing, whereby a lateral adjustment may be had between the driving rollers and the drill stem.

Another object of this invention is to provide a drill stem roller drive bushing having a floating centering device adapted to act independently of the driving rollers to hold the drill stem in proper driving alignment.

Another object of this invention is to provide a drill stem drive device having driving rollers of large diameter in order that the unit pressure between the rollers and the drill stem need not become excessive.

Other objects and advantages of this invention it is believed will be apparent from the following detailed description of a preferred embodiment thereof as illustrated in the accompanying drawings.

In the drawings:

Figure 1 is a side elevation of a drill stem roller drive bushing embodying my invention and illustrating the same as adapted in position in relation to a rotary machine which machine is illustrated in fragmentary elevation.

Figure 2 is a top plan view of a rotary drill stem drive bushing taken substantially on line 2—2 of Figure 1 and illustrating the various parts in driving position.

Figure 3 is a sectional view taken substantially on the line 3—3 of Figure 1 but illustrating the various parts in free, or disengaged position.

Figure 4 is a sectional view taken substantially on the line 4—4 of Figure 1.

Figure 5 is a sectional view taken substantially on the line 5—5 of Figure 2 and is a detail sectional view illustrating the eccentric mounting of the bearing housings.

Figure 6 is a top plan view of a rotary drill stem drive bushing embodying my invention illustrating certain of the parts broken away to illustrate the detail of the adjustable roller mounting, and is particularly illustrative of the condition where the rotational axis of the roller and the axis of its shaft do not coincide.

Figure 7 is a sectional view taken substantially on the line 7—7 of Figure 6.

In the preferred embodiment of my invention as illustrated in the accompanying drawings, I indicates the table of a rotary machine which is rotatably mounted upon a base 2. The rotary table I is adapted to be driven with relation to the base 2 in a manner well understood in the art. Mounted in the table I is a bushing 3 having a tapered opening to receive the tapered portion 9 of the body 4 of the rotary drill stem roller drive bushing embodying my invention. The rotary machine is illustrated fragmentarily and is of any desired or preferred construction which is well understood in the art.

Supported by the body 4 is a pair of rollers 5 which are mounted upon spherical bearings 6.

The spherical bearings 6 are mounted upon shafts 7 by means of spaced bearings 8.

The body 4 is, at its lower end, provided with a tapered portion 9 which is adapted to fit within the tapered section of the bushing 3 and is likewise provided with a polygonal section 10 adapted to cooperate with the central bore of the rotary table 1 and form a non-rotative engagement therewith. The engaging rollers 5 engage the driving faces 11 of the drill stem 12, permitting free longitudinal movement of the drill stem 12 and at the same time providing a positive driving connection for rotating the drill stem 12 as the rotary table 1 is rotated.

The spherical bearings 6 upon which the rollers 5 are mounted allow the rollers 5 to adjust themselves to the driving position of the drill stem 12 and also to adjust themselves to any irregularity in the cross section of the drill stem 12. In the non-driving position as illustrated in Figure 3, there is a clearance provided between rollers 5 and the drill stem 12. When the drill stem bushing 3 is turned through an angle with respect to the drill stem 12, this clearance disappears and the rollers 5 adapt themselves to driving engagement with the drill stem 12 as indicated in Figure 2 whereby the rollers 5 orient themselves on their spherical seats 6 so as to give a full driving contact between the peripheries of the rollers 5 and the drive faces 11 of the drill stem 12.

When the driven faces 11 of the drill stem 12 in the driving position are parallel to the axes of the shafts 7 as illustrated in Figure 2, there is no need for relative movement between the rollers 5 and their spherical bearings 6. Under this condition the rollers simply revolve about the axes of the shafts 7. However, owing to wear, or irregularity of the cross-section of the drill stem, or other reasons, this condition does not in fact exist for any material period of time. In such case the rollers 5 cannot have simple rotation because they must revolve about an axis which is not coincident with the axes of the shafts 7. This particular condition is illustrated in Figures 6 and 7. The frictional resistance of the shafts 7 in their bearings 8 is less than that between the rollers 5 and their spherical bearings 6 so that the shafts 7 revolve with the rollers 5. Although the rollers 5 do not revolve upon their own spherical seats 6, an oscillation or skewing action takes place when the rotational axis of each roller 5 does not coincide with the axis of its shaft 7. As illustrated in Figures 6 and 7, each roller will skew on its spherical bearing 6 as they both rotate in order that line contact with the drill stem 12 may be maintained. This skewing action is resisted by the frictional resistance between the rollers 5 and their spherical seats 6. In order to overcome this frictional drag, a guide means is applied to the rollers 5 as long as this skewing motion is necessary.

In describing the location and action of this guide it is well to define the term "principal plane" of each roller 5. This "principal plane" is that plane which passes through the center of oscillation of the roller 5 and which is normal at all points to the outer cylindrical surface of the roller 5. The forces exerted by the guide means act in a vertical plane including the rotational axis of the roller 5 and which is normal to this "principal plane."

The preferred form of guide means I have illustrated in Figures 6 and 7 where there is illustrated openings 13 formed through the body 4 at points directly above the axes of the shafts 7. Extended through the openings 13 above each roller 5 is a bracket 14. Pivotally supported at the center of each bracket 14 is a yoke 15 adapted to rotatably carry anti-friction roller elements 16. The anti-friction elements 16 contact the side faces of the rollers 5 and have only running clearance therewith. The brackets 14 are provided with depending arms 17 which may be engaged by set screws 18 to adjust the position of the brackets 14 in a direction parallel to the axes of the shafts 7. Cap screws 19 may be further provided to maintain the brackets 14 in adjusted position. The yokes 15 and roller elements 16 provide the guide for the rollers 5 and since each yoke 15 is pivotally mounted, the forces are maintained in the proper plane.

As illustrated in Figure 7, the right-hand roller element 16 bears against the side face of the roller 5 when the drill stem 12 is lowered, and the left-hand element 16 bears against the other side of the roller 5 when the drill stem 12 is raised. The guide assemblies as thus provided are utilized whenever the axes of the rollers 5 and the axes of the respective shafts 7 are not coincident in order that line contact may be maintained between the rollers 5 and the faces 11 of the drill stem 12. When the said axes are coincident, the guide means simply provide the necessary stability for the rollers 5 upon their spherical bearings 6.

In order to permit of assembly, the rollers 5 are preferably formed in two sections secured together as illustrated in Figure 1. The body 4 is preferably constructed of two mating halves and hollow dowels 20 may be advantageously employed to align the halves of the body 4 and bolts 21 may then be passed through the dowels 20 to secure the halves in position. Each of the bearings 8 is carried in a bearing housing 22 supported in the body 4. Each housing also carries a thrust bearing 23 to receive the end thrusts from the shafts 7. The outer cylindrical surface 24 of each of the housings 22 is formed eccentrically with respect to the bearings 8. By removing the securing bolts 25, each housing 22 may be turned with respect to the body 4 to provide a lateral adjustment of the rollers 5 with respect to the drill stem 12. The bolt circles for the bolts 25 are of course concentric with the outer surface 24 of the housings 22 in order that the housings may be secured in any one of several positions.

The centers of the spherical bearings are not positioned directly opposite each other but are offset so that the rollers 5 will contact only the leading edges of the driving faces 11 of the drill stem 12 whereby a greater torque can be transmitted to the drill stem 12 for the same unit pressure on the rollers 5.

In order to center the drill stem 12 within the drill stem roller drive bushing, a pair of guide rollers 26 are provided. The guide rollers 26 are journaled in openings provided in a floating member 27. The floating member 27 may be horizontally split and secured together as by means of welding 28 in order to facilitate assembly. The floating member 27 may be also split vertically into two halves, each carrying a roller 26, in order that it may be assembled about the drill stem 12. When assembled in position within the recess 29 formed in the body 4, this floating member 27 functions as an integral unit to carry the guide rollers 26.

A plate 30 is provided and is secured to the body 4 by cap screws 31 in order to prevent a longitudinal movement of the floating member 27. The plate 30 may be formed of two sections fitted together with a lap-joint 32 (Figure 1). As the guide rollers 26 are carried by the floating member 27, it will be obvious that said rollers 26 function merely as a centering means and can form no part of the torque transmitting system.

In order to provide for lubrication of the bearings 8 and 23, lubricant may be provided under pressure through pressure fittings 33 accessible from the exterior of the body 4. One of the fittings 33 for each of said shafts 7 also provides lubricant through a passageway 34 to the spherical bearings 6 for the rollers 5.

Having fully described my invention, it is to be understood that I do not wish to be limited to the details herein set forth, but my invention is of the full scope of the appended claims.

I claim:

1. In a drill stem drive bushing for a rotary machine, the combination of a base having a non-rotative engagement with the table of a rotary machine, a plurality of rollers rotatably mounted relative to the base and adapted to contact the driving faces of a drill stem, and means to support each of said rollers to have, within certain limits, universal swiveling movement in all directions with respect to a center of movement defined by the intersection of the rotational axis of the roller and its principal plane.

2. In a device of the class described, the combination of a rotary drive member having a central bore, a base adapted to be rotated by said member and having an opening coextensive with said bore, a plurality of rollers carried by the base and positioned adjacent the opening, means carried by the base and adapted to support each of said rollers to have universal swiveling movement in all directions with respect to a center of movement defined by the intersection of the rotational axis of the roller and its principal plane, and additional means carried by the base adapted to maintain the principal plane of each roller in a substantially vertical position.

3. A drill stem drive bushing for a rotary machine comprising in combination a base having a non-rotative engagement with a rotary machine, a plurality of rollers rotatably mounted with respect to said base and positioned adjacent the driving faces of a drill stem, each roller being capable of limited movement about an axis of symmetry which is substantially vertical, and adjustable means carried by the base and adapted to limit the inclination of the axis of rotation of the roller.

4. In a drill stem drive bushing for a rotary machine, the combination of a base having a non-rotative engagement with said rotary machine, a plurality of rollers rotatably mounted relative to said base and adapted to contact the driving faces of a drill stem, separate means to support each of said rollers to have, within certain limits, universal swiveling movement in all directions with respect to a center of movement defined by the intersection of the rotational axis of the roller and its principal plane, each of said means including a shaft rotatably mounted on said base, said center of movement lying on the rotational axis of said shaft.

5. A drill stem drive bushing for a rotary machine comprising in combination, a base having a non-rotative engagement with a rotary machine, a shaft rotatably mounted on said base, spaced bearings for the shaft, a roller mounted on the shaft intermediate said bearings and adapted to contact a driving face of a drill stem, bearing housings for said bearings, said bearing housings being eccentrically mounted on said base to provide an adjustment for said roller relative to the drill stem, and means to secure said housings in adjusted position.

6. A drill stem drive bushing for a rotary machine comprising in combination, a base having a non-rotative engagement with a rotary machine, a pair of substantially cylindrical rollers rotatably mounted with respect to said base and positioned on opposite sides of a drill stem, each roller being capable of limited movement about an axis of symmetry which is substantially vertical, the principal planes of said rollers in driving position being substantially parallel but not coincident, whereby the rollers drive diagonally opposite faces of the drill stem.

7. A drill stem drive bushing for a rotary machine comprising in combination, a base having a non-rotative engagement with a rotary machine, a plurality of substantially cylindrical rollers rotatably mounted with respect to said base and positioned adjacent the driving faces of a drill stem, each roller being capable of limited movement about an axis of symmetry which is substantially vertical, the principal planes of said rollers in driving position each passing through the drill stem in eccentric relation to its longitudinal axis, whereby the rollers contact substantially less than the full width of the driving faces of the drill stem.

8. A drill stem drive bushing for a rotary machine comprising in combination, a base having a non-rotative engagement with a rotary machine, a plurality of substantially cylindrical rollers rotatably mounted with respect to said base and positioned adjacent the driving faces of a drill stem, the outer diameter of each roller being greater than the thickness of the drill stem, and each roller being capable of limited movement about its vertical axis of symmetry, whereby initial clearance between the rollers and the driving faces of the drill stem may vanish upon orientation of the rollers into driving position.

9. In a drill stem drive bushing for a rotary machine, the combination of a base having a non-rotative engagement with a rotary machine, a pair of rollers adapted to contact the driving faces of a drill stem, separate means to support each roller on said base, each of said means including a shaft rotatably supported in spaced bearings and provided with a spherical element therebetween, the rollers being mounted on said spherical elements in self-aligning relation to said drill stem, whereby initial clearance between the rollers and the driving faces of the drill stem may vanish upon orientation of the rollers into driving position.

10. In combination with a rotary machine, a drive bushing adapted to cooperate therewith to impart rotation to a drill stem, said drive bushing having a guide adapted to cooperate with the drill stem to maintain the latter in proper driving position, said guide being mounted for freedom of rotary movement relative to said bushing about the axis of the drill stem.

11. In combination with a rotary machine, a drive bushing adapted to cooperate therewith to impart rotation to a drill stem, said drive bushing having a guide adapted to cooperate with the drill stem to maintain the latter in proper driving position, a support on said drive bushing, said guide including a sectional member positioned about the drill stem and mounted for swiveling movement relative to said support.

12. In combination with a rotary machine, a drive bushing adapted to cooperate therewith to impart rotation to a drill stem, said drive bushing having a guide adapted to cooperate with the drill stem to maintain the latter in proper driving position, a support on said drive bushing, said guide including a sectional member positioned about the drill stem and mounted for swiveling movement relative to said support, and a roller element carried by each portion of said sectional member and adapted to contact the drill stem.

13. In a device of the class described for use with a drill stem of polygonal cross section, the combination of a base having an opening through which the drill stem extends, a guide member carried on said base and encircling the drill stem, said guide member being adapted for rotary movement relative thereto about the longitudinal axis of the drill stem, said guide member having roller elements adapted to contact certain of the faces of said drill stem, drive rollers rotatably mounted on said base and positioned adjacent certain other faces of said drill stem, the roller elements of the guide member and the drive rollers cooperating to maintain the drill stem in proper driving position within said opening in the base.

14. A drill stem drive bushing for a rotary machine comprising in combination, a base having a non-rotative connection with a rotary machine, said base having a central bore terminating in a shoulder, a guide member in said bore and free to revolve relative to said shoulder, said guide member being adapted to contact the drill stem to maintain it in a central position, and drive means on said base adapted to impart rotation to the drill stem upon rotation of the rotary machine.

15. A drill stem drive bushing for a rotary machine comprising in combination, a base having a non-rotative connection with a rotary machine, said base having a central bore terminating in an annular shoulder, a guide member in said bore and free to revolve relative to said annular shoulder, said guide member having roller elements adapted to contact the drill stem to maintain it in a central position, and drive means on said base adapted to impart rotation to the drill stem upon rotation of the rotary machine.

16. A drill stem drive bushing for a rotary machine comprising in combination, a base having a non-rotative connection with a rotary machine, said base having a central bore terminating in an annular shoulder, a guide member in said bore and free to revolve relative to said annular shoulder, a cap member secured to said base and adapted to confine said guide member in said bore, said guide member being adapted to contact the drill stem to maintain it in a central position, and drive means on said base adapted to impart rotation to the drill stem upon rotation of the rotary machine.

17. A drill stem drive bushing for a rotary machine comprising in combination, a base having a non-rotative connection with a rotary machine, said base having a central bore terminating in an annular shoulder, a guide member in said bore and free to revolve relative to said annular shoulder, a cap member secured to said base and adapted to confine said guide member in said bore, said guide member having roller elements adapted to contact the drill stem to maintain it in a central position, and drive means on said base adapted to impart rotation to the drill stem upon rotation of the rotary machine.

18. In combination with a rotary machine, a drive bushing adapted to cooperate therewith to impart rotation to a drill stem, said drive bushing having a base portion provided with a central opening through which the drill stem extends, said opening having a circular bore near one end terminating in an annular shoulder, guide means for the drill stem positioned on said shoulder and within said bore, said guide means including a sectional member positioned about the drill stem and fitting loosely within the bore whereby it may revolve in said bore as a unit, a roller element carried by each portion of said sectional member and adapted to contact the drill stem, and a cap member secured to said base portion of the drive bushing and adapted to prevent displacement of the guide means.

JOHN D. SPALDING.